United States Patent
Eckel et al.

(10) Patent No.: US 6,686,404 B1
(45) Date of Patent: Feb. 3, 2004

(54) FLAME-RESISTANT POLYCARBONATE ABS MOULDING COMPOUNDS

(75) Inventors: Thomas Eckel, Dormagen (DE); Michael Zobel, Düsseldorf (DE); Dieter Wittmann, Leverkusen (DE); Nikolaus Janke, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/582,955

(22) PCT Filed: Jan. 5, 1999

(86) PCT No.: PCT/EP99/00024

§ 371 (c)(1),
(2), (4) Date: Jul. 7, 2000

(87) PCT Pub. No.: WO99/36474

PCT Pub. Date: Jul. 22, 1999

(30) Foreign Application Priority Data

Jan. 15, 1998 (DE) ........................................ 198 01 198

(51) Int. Cl.$^7$ ............................. C08K 5/52; C08K 5/06; C08K 3/32
(52) U.S. Cl. ...................... 524/127; 524/141; 524/240; 524/375; 524/430; 524/444
(58) Field of Search ................................ 524/127, 141, 524/375, 238, 240, 109, 114, 451, 410, 411, 412, 430, 444

(56) References Cited

U.S. PATENT DOCUMENTS

| | | | |
|---|---|---|---|
| 4,463,130 A | 7/1984 | Serini et al. | 525/67 |
| 5,969,016 A | * 10/1999 | Weber et al. | 524/127 |

FOREIGN PATENT DOCUMENTS

EP      0 363 608 A1 * 4/1990

* cited by examiner

*Primary Examiner*—Robert Harlan
(74) *Attorney, Agent, or Firm*—Joseph C. Gil; Aron Preis

(57) ABSTRACT

Flame-retardant thermoplastic moulding compositions containing an aromatic polycarbonate or polyestercarbonate, a graft polymer, a thermoplastic vinyl copolymer, a fluorinated polyolefin, 0.5 to 20 parts by weight of at least one phosphorus compound of general formula (I)

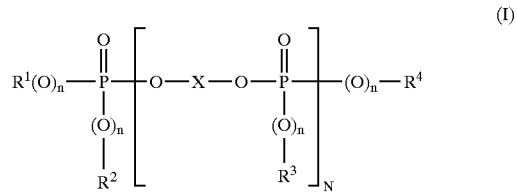

wherein the average degree of polycondensation N of component D is always >5, a very finely divided inorganic powder with an average diameter of 0.1 to 200 nm and/or a monophosphorus compound, wherein the sum of the parts by weight of all the components is 100.

17 Claims, No Drawings

FLAME-RESISTANT POLYCARBONATE ABS MOULDING COMPOUNDS

The present invention relates to polycarbonate-ABS moulding compositions which exhibit excellent flame-resistance, and which contain, as a flame-retardant combination, oligomeric phosphorus compounds with an average degree of polycondensation of >5 and inorganilc nanoparticles and/or monophosphates.

EP-A 0 640 655 describes moulding compositions which comprise aromatic polycarbonates, copolymers which contain styrene, and graft polymers, and which can be made flame-retardant by treating them with monomeric and oligomeric phosphorus compounds with a degree of polycondensation of 1 to 2.

EP-A 0 363 608 describes flame-retardant polymer mixtures of aromatic polycarbonates, copolymers which contain styrene, or graft polymers, as well as oligomeric phosphates as flame-retardant additives. In order to achieve a satisfactory degree of flame-retardancy, the degree of polycondensation has to be within the range from 1.2 to 1.7. Examples verify that a degree of polycondensation of 2.8 results in unsatisfactory flame-retardancy.

EP-A 0 103 230 describes moulding compositions comprising special polycarbonates, copolymers which contain styrene, or graft polymers, and to which flame-resistance can likewise be imparted with polyphosphates. The polyphosphates which are used preferably have a degree of polycondensation from 4 to 25, wherein, in order to achieve flame-resistance, either a second halogen-containing flame-retardant has to be used in combination with the polyphosphates or the polyphosphates have to be used in relatively large amounts.

The object of the present invention was therefore to produce flame-retardant polycarbonate-ABS moulding compositions to which outstanding flame-retardancy can be imparted by treating them with phosphorus compounds, which have an average degree of polycondensation which is as high as possible, in conventional amounts in order to keep the tendency of the flame-retardant to migrate to the surface during processing as low as possible. The object was also that the polycarbonate-ABS moulding compositions should have good mechanical properties.

Surprisingly, this has been achieved by the use of oligomeric phosphorus compounds, preferably phosphate compounds, with a degree of polycondensation >5, in conventional amounts, in combination with inorganic nanoparticles and/or monophosphorus compounds.

The present invention therefore relates to flame-retardant thermoplastic moulding compositions containing A. 5 to 95, preferably 30 to 90 parts by weight, particularly preferably 50 to 80 parts by weight, of an aromatic polycarbonate or polyestercarbonate, B. 0.5 to 60, preferably 1 to 40 parts by weight, particularly preferably 2 to 25 parts by weight, of at least one graft polymer of
B.1 5 to 95, preferably 30 to 80 wt. % of one or more vinyl monomers on
B.2 95 to 5, preferably 70 to 30 wt. % of one or more graft substrates with a glass transition temperature <1.0° C., preferably <0° C., particularly preferably <−20° C., C. 0 to 45, preferably 0 to 30, particularly preferably 2 to 25 parts by weight of a thermoplastic vinyl copolymer, D. 0.5 to 20 parts by weight, preferably 1 to 18 parts by weight, particularly preferably 2 to 15 parts by weight, of at least one phosphorus compound of general formula (I)

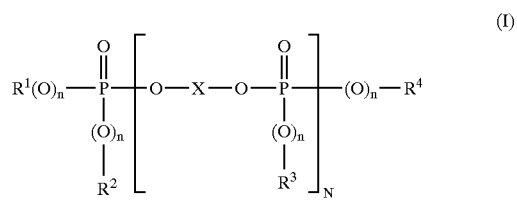

wherein
$R^1$, $R^2$, $R^3$, and $R^4$, independently of each other, each represent $C_1$- to $C_8$-alkyl, $C_5$- to $C_6$-cycloalkyl, $C_6$- to $C_{20}$-aryl or $C_7$- to $C_{12}$-aralkyl, which are optionally halogenated, n represents 0 or 1, which are independent of each other, and preferably represents 1, N is a number from 5 to 30, preferably 5.5 to 20, particularly preferably 6 to 10, wherein for mixtures of oligomeric phosphorus compounds the average degree of polycondensation N of component D is >5, and X represents a mono- or polynuclear aromatic radical containing 6 to 30 carbon atoms, which is optionally substituted, E 0 to 5 parts by weight, preferably 0.15 to 1 part by weight, particularly preferably 0.1 to 0.5 parts by weight of a fluorinated polyolefin, and F.1 0.5 to 40, preferably 1 to 25, particularly preferably 2 to 15 parts by weight of a very finely divided inorganic powder with an average particle diameter of less than or equal to 200 nm, and/or F.2 0.5 to 20, preferably 1 to 18, particularly preferably 2 to 15 parts by weight of a monophosphorus compound of formula (IA)

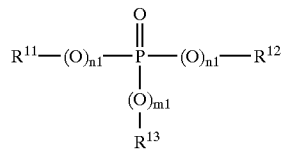

wherein
$R^{11}$, $R^{12}$, and $R^{13}$, independently of each other denote $C_1$–$C_5$-alkyl, which is optionally halogenated, or $C_6$–$C_{20}$-aryl, which is optionally halogenated, ml denotes 0 or 1, and nl denotes 0 or 1, wherein the sum of all the parts by weight of A+B+C+D+E+F is 100.

Moulding compositions which are also quite particularly preferred are those in which the ratio by weight of components B:C, provided that C is present, is between 2:1 and 1:4 preferably between 1:1 and 1:3.

Component A

Aromatic polycarbonates and/or aromatic polyestercarbonates corresponding to component A which are suitable according to the invention are known from the literature or can be produced by methods which are known from the literature (for the production of aromatic polycarbonates, see Schnell, "Chemistry and Physics of Polycarbonates", Interscience Publishers, 1964, as well as DE-AS 1 495 626, DE-OS 2 232 877, DE-OS 2 703 376, DE-OS 2 714 544, DE-OS 3 000 610 or DE-OS 3 832 396, for example; for the production of aromatic polyestercarbonates, see DE-OS 3 077 934 for example).

Aromatic polycarbonates are prepared, for example, by the reaction of diphenols with carbonic acid halides, preferably phosgene, and/or with aromatic dicarboxylic acid dilhalides, preferably benzenedicarboxylic acid dihalides, by the phase boundary process, optionally with the use of chain terminators, for example monophenols, and optionally with the use of trifunctional branching agents or branching agents with a functionality greater than three, for example triphenols or tetraphenols.

Diphenols for the production of aromatic polycarbonates and/or aromatic polyestercarbonates are preferably those of the formula (II) wherein

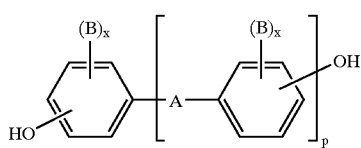

(II)

A denotes a single bond, a $C_1$–$C_5$ alkylene, $C_2$–$C_5$ alkylidene, $C_5$–$C_6$ cycloalkylidene, —O—, —SO—, —CO—, —S—, —SO_2— a $C_6$–$C_{12}$-arylene radical, which can be condensed with other rings which optionally contain heteroatoms, a radical of formula (III)

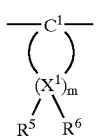

(III)

or a radical of formula (IV)

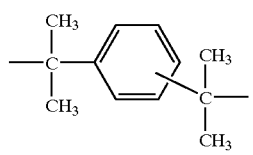

(IV)

radicals B, independent of each other, each denote a $C_1$–$C_8$ alkyl radical, preferably methyl, a halogen, preferably chlorine and/or bromine, a $C_6$–$C_{10}$-aryl radical, preferably phenyl, or a $C_7$–$C_{12}$-aralkyl radical, preferably benzyl, x denotes 0, 1 or 2, which are independent of each other in each case, p is 1 or 0, and $R^5$ and $R^6$ can be selected individually and independently of each other for each $X^1$, and denote hydrogen or $C_1$–$C_6$-alkyl, preferably hydrogen, methyl or ethyl, $X^1$ denotes carbon, and m denotes an integer from 4 to 7, preferably 4 or 5, with the proviso that $R^5$ and $R^6$ simultaneously denote alkyl on at least one $X^1$ atom.

The preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and ring-brominiated and/or ring-chlorinated derivatives thereof.

The diphenols which are particularly preferred are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone, and di- and tetrabrominated or chlorinated derivatives thereof, such as 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane for example.

2,2-bis-(4-hydroxyphenyl)-propane (bisphenol A) is particularly preferred.

The diphenols may be used individually or as arbitrary mixture.

These diphenols are known from the literature or are obtainable by methods known from the literature.

Examples of suitable chain terminators for the production of the thermoplastic, aromatic polycarbonates include phenol, p-chlorophenol, p-tert.-butylphenol or 2,4,6-tribromophenol, and also include long-chain alkylphenols, such as 4-(1,3-tetramethlylbutyl)-phenol according to DE-OS 2 842 005, or a monoalkylphenol or dialkylphenols containing a total of 8 to 20 carbon atom is in their alkyl substituents, such as 3,5-di-tert.butylphenol, p-iso-octylphenol, p-tert.-octylphenol, p-dodecylophenol, 2-(3,5-dimethylhepyl)-phenol and 4-(3,5-dimethylheptyl)-phenol. The amount of chain terminators used is generally between 0.5 mol. % and 10 mol. % with respect to the molar sum of the diphenols used each time.

The thermoplastic, aromatic polycarbonates have average, weight average molecular weights ($M_w$, as measured, eg., by ultracentrifuge or scattered light measurements) from 10,000 to 200,000, preferably 20,000 to 80,000.

The thermoplastic, aromatic polycarbonates can be branched in a known manner, preferably by the incorporation of 0.05 to 2.0 mol. %, with respect to the sum of the diphenols used, of compounds with a functionality ≧three, for example those which contain ≧three phenolic groups.

Both homopolycarbonates and copolycarbonates are suitable. 1 to 25 wt. %, preferably 2.5 to 25 wt. % (with respect to the total amount of diphenols to be used) of polydiorganosiloxanes containing terminal hydroxy-aryloxy groups can also be used for the production of copolycarbonates according to the invention which correspond to component A. These are known (see U.S. Pat. No. 3,419,634, for example) or can be produced by methods which are known from the literature. The production of copolycarbonates which contain polydiorganosiloxanes is described in DE-OS 3 334 782, for example.

Apart from homopolycarbonates of bisphenol A, the preferred polycarbonates are the copolycarbonates of bisphenol A with up to 15 mol. %, with respect to the molar sum of diphenols, of other diphenols which have been cited as being preferred or particularly preferred, especially 2,2-bis-(3,5-dibromo-4-hydroxyphenyl)-propane.

The preferred dicarboxylic acid dihalides for the production of aromatic polyestercarbonates are the diacid dichlorides of isophthalic acid, terephthalic acid, diphenlyether-4,4'-dicarboxylic acid and naphthialene-2,6-dicarboxylic acid.

Mixtures of the diacid dichlorides of isophthalic acid and terephthalic acid in a ratio between 1:20 and 20:1 are particularly preferred.

A carbonic acid halide, preferably phosgene, is additionally used in conjunction as a bifunctional acid derivative during the production of the polyestercarbonates.

Apart from the monophenols cited above, suitable chain terminators for the production of the aromatic polyestercarbonates also include chlorocarbonic acid esters as well as the acid chlorides of aromatic monocarboxylic acids, which may optionally be substituted by $C_1$–$C_{22}$-alkyl groups or by halogen atoms, as well as $C_2$–$C_{22}$ monocarboxylic acid chlorides.

The amount of each chain terminator in each case is 0.1 to 10 mol. %; in the case of phenolic chain terminators, this amount is given with respect to the moles of diphenols and in the case of monocarboxylic acid chloride chain terminators is given with respect to the moles of dicarboxylic acid dichlorides.

The aromatic polyestercarbonates may also contain aromatic hydroxycarboxylic acids which have been incorporated.

The aromatic polyestercarbonates can be linear, or can also be branched in the known manner (see DE-OS 2 940 024 and DE-OS 3 007 934 in this respect also).

Examples of branching agents include tri- or multi-functional carboxylic acid chlorides such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in amounts of 0.01 to 1.0 mol. % (with respect to the dicarboxylic acid dichlorides used), or tri- or multi-functional phenols, such as phloroglucinol, 4,6-dimethyl-2,4,6-tri-(4-hydroxyphenyl)-hept-2-ene, 4,4-dimethyl-2,4-6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl-methane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hdroxyphenyl)-2-(2,4-dihydroxyphenyl)-propane, tetra-(4-[4-hydroxyphenyl-isopropyl]-phenoxy)-methane, 1,4-bis-[4,4'-dihydroxytriphenyl)-methyl]-benzene, in amounts of 0.01 to 1.0 mol. %, with respect to the diphenols used. Phenolic branching agents can be placed in the reaction vessel with the diphenols. Acid chloride branching agents can be added together with the acid dichlorides.

In the thermoplastic, aromatic polyestercarbonates, the content of carbonate structural units can be arbitrarily varied. The content of carbonate groups preferably amounts to up to 100 mol. %, particularly up to 80 mol. %, particularly preferably up to 50 mol. %, with respect to tile sum of ester groups and carbonate groups.

Both the ester and the carbonate constituents of tile aromatic polyestercarbonates may be present in the form of blocks or may be randomly distributed in the polycondensate.

The relative viscosity ($\eta_{rel}$) of the aromatic polycarbonates and polyestercarbonates falls within the range from 1.18 to 1.4, preferably 1.22 to 1.3 (as measured using solutions of 0.5 g of polycarbonate or polyestercarbonate in 100 ml of $CH_2Cl_2$ solution at 25° C.).

The thermoplastic, aromatic polycarbonates and polyestercarbonates can be used on their own or in any mixture with each other.

Component B

Component B comprises one or more graft polymers of
B.1 5 to 95, preferably 30 to 80 wt. %, of at least one vinyl monomer, on B.2 95 to 5, preferably 70 to 20 wt. %, of one or more graft substrates with glass transition temperatures <10° C., preferably <0° C., particularly preferably <–20° C., In general, graft substrate B.2 has an average particle size ($d_{50}$ value) of 0.05 to 5 µm, preferably 0.10 to 0.5 µm, particularly preferably 0.20 to 0.40 µm.

Monomers B.1 are preferably mixtures of

B.1.1 50 to 99 parts by weight of aromatic vinyl compounds and/or ring-substituted aromatic vinyl compounds (such as styrene, α-methylstyrene, p-methylstyrene or p-chlorostyrene for example) and/or ($C_1$–$C_4$) alkyl esters of methacrylic acid (such as methyl methacrylate or ethyl methacrylate for example), and B.1.2 1 to 50 parts by weight of vinyl cyanides (unsaturated nitriles such as acrylonitrile and methacrylonitrile) and/or ($C_1$–$C_8$) alkyl esters of (meth)acrylic acid (such as methyl methacrylate, n-hutyl acrylate or t-butyl acrylate for example) and/or derivatives (such as anhydrides and imides) of unsaturated carboxylic acids (for example maleic anhydride and N-phenyl-maleic imide).

The preferred monomers B.1.1 are selected from at least one of the monomers styrene, α-methylstyrene and methyl methacrylate; the preferred monomers B.1.2 are selected from at least one of the monomers acrylonitrile, maleic anhydride and methyl methacrylate.

Monomers which are particularly preferred are styrene as B.1.1 and acrylonitrile as B.1.2.

Examples of graft substrates B.2 which are suitable for graft polymers B include diene rubbers, EP(D)M rubbers, namely those which are ethylene/propylene- and optionally diene-based, and acrylate, polyurethane, silicone, chloroprene and ethylene/vinyl acetate rubbers.

The preferred graft substrates B.2 are diene rubbers (e.g. those based on butadiene, isoprene, etc.) or mixtures of dicile rubbers or copolymers of diene rubbers or mixtures thereof with other copolymerisable monomers (e.g. those according to B.1.1 and B.1.2) with the proviso that the glass transition temperature of component B.2 is less than <10° C., preferably <0° C. and particularly preferably <–10° C.

Pure polybutadiene rubber is particularly preferred.

Examples of polymers B which are particularly preferred include ABS polymers (emulsion, bulk and suspension ABS), such as eg., those which are described in DE-OS 2 035 390 (=U.S. Pat. No. 3,644,574) or in DE-OS 2 248 242 (=GB-PS 1 409 275) or in Ullmann, Enzyklopädie der Technischen Chemie, Vol. 19 (1980), page 280 et seq. The gel content of graft substrate B.2 is at least 30 Wt. %, preferably at least 40 wt. % (as measured in toluene).

Graft copolymers B are produced by radical polymerization,. e.g. by emulsion, suspension, solution or bulk polymerisation, preferably by emulsion polynmerisation.

Graft rubbers which are particularly suitable are ABS polymers which are produced by redox initiation with an initiator system comprising an organic hydroperoxide and ascorbic acid according to U.S. Pat. No. 4,937,285.

Since, as is known, the graft monomers are not grafted absolutely completely on to the graft substrate during the grafting reaction, graft polymers B according to the invention are also to be understood as those products which are obtained by (co)polymerisation of the graft monomers in the presence of the graft substrate and which are also produced during the process.

Suitable acrylate rubbers corresponding to 13.2 of polymers B are preferably polymers of alkyl esters of acrylic acid, optionally with up to 40 wt. %, with respect to B.2, of other polymerisable, ethylenically unsaturated monomers. The preferred polymerisable esters of acrylic acid comprise $C_1$–$C_8$-alkyl esters, for example methyl, ethyl, butyl, n-octyl and 2-ethylhexyl esters; halogenoalkyl esters, preferably halogeno-$C_1$–$C_8$-alkyl esters such as chloroethyl acrylate, as well as mixtures of these monomers.

Monomers containing more than one polymerisable double bond can be polymerised for crosslinking. Preferred examples of crosslinking monomers include esters of unsaturated monocarboxylic acids containing 3 to 8 carbon atoms and unsaturated monohydric alcohols containing to 12 carbon atoms, or saturated polyols containing, 2 to 4 OH groups and 2 to 20 carbon atoms, such as. eg., ethylene glycol dimethacrylate or allyl methacrylate, multiply-unsaturated heterocyclic compounds, such as trivinyl and triallyl cyanurate for example; polyfunctional vinyl compounds, such as di- and trivinylbenzenes; and also triallyl phosphate and diallyl phthalate.

The preferred crosslinking monomers are allyl methacrylate, ethylene glycol dimethiacrylate, diallyl phthalate, and heterocyclic compounds which contain at least 3 ethylenically unsaturated groups.

The crosslinking monomers which are particularly preferred are the cyclic monomers triallyl cyanlurate, triallyl isocyanurate, triacryloylhexalhydro-s-triazine and triallyl benzenes. The amount of crosslinked monomers is preferably 0.02 to 5, particularly 0.05 to 2 wt. %, with respect to graft substrate B.2.

For cyclic crosslinking monomers which contain at least 3 ethylenically unsaturated groups, it is advantageous to restrict the amount thereof to less than 1 wt. % of graft substrate B.2.

Examples of preferred "other" polymerisable, ethylenically unsaturated monomers, which can optionally be employed in addition to esters of acrylic acid for the production of graft substrate B.2, include acrylonitrile, styrene, α-methylstyrene, acrylamides, vinyl $C_1$–$C_6$-alkyl ethers, methyl methacrylate and butadiene. The acrylate rubbers which are preferred as graft substrate B.2 are emulsion polymers which have a gel content of at least 60 wt. %.

Other suitable graft substrates for use as B.2 are silicone rubbers containing graft-active sites, such as those described in DE-OS 3 704 657, De-OS 3 704 655, DE-OS 3 631 540 and DE-OS 3 631 539.

The gel content of graft substrate B.2 is determined at 25° C. in a suitable solvent (M. Hoffmann, H. Krömer. R Kuhn, Polymeranalytik I and II, Georg Thieme-Verlag, Stuttgart 1997).

The average particle size $d_{50}$ is the diameter above and below which 50 wt. % of the particles lie in each case. It can be determined by means of ultracentrifuge measurement (W. Scholtan, 14. Lange, Kolloid, Z. und Z. Polymere 250 (1972), 782–1796.

Component C

Component C comprises one or more thermoplastic vinyl (co)polymers.

Suitable (co)polymers C are (co)polymers of at least one monomer from the group comprising aromatic vinyl compounds, vinyl cyanides (unsaturated nitriles), ($C_1$–$C_x$) alkyl esters of (meth)acrylic acid, unsaturated carboxylic acids and derivatives (such as anhydrides and imides) of unsaturated carboxylic acids. (Co)polymers which are particularly suitable are those formed from C.1 50 to 99, preferably 60 to 80 parts by weight of aromatic vinyl compounds and/or ring-substituted aromatic vinyl compounds (such as, eg., styrene, α-methylstyrene, p-methylstyrene, p-chlorostyrene) and/or ($C_1$–$C_4$) alkyl esters of methacrylic acid (such as methyl methacrylate or ethyl methacrylate for example), and C.2 1 to 50, preferably 20 to 40 parts by weight of vinyl cyanides (unsaturated nitriles) such as acrylonitrile and methacrylonitrile and/or ($C_1$–$C_8$) alkyl esters of (meth) acrylic acid (such as methyl methacrylate, n-butyl acrylate or t-butyl acrylate for example) and/or unsaturated carboxylic acids (such as maleic acid) and/or derivatives (such as anhydrides and imides) of unsaturated carboxylic acids (for example maleic anhydride and N-phenyl-maleic imide).

(Co)polymers C are resin-like, thermoplastic and rubber-free.

Copolymers formed from styrene as C.1 and acrylonitrile as C.2 are particularly preferred.

(Co)polymers which can be used as C are known and can be produced by radical polymerisation, particularly by emulsion, suspension, solution or bulk polymerisation. (Co) polymers which can be used as component C preferably have molecular weights $\overline{M}_w$ (weight average, as determined by light scattering or by sedimentation) between 15,000 and 200,000.

(Co)polymers which can be used as component C frequently arise as by-products during the graft polymerisation of component B, particularly if large amounts of monomers B.1 are grafted on to small amounts of rubber B.2. The amount of C which can optionally also be used according to the invention does not include these by-products of the graft polymerisation of B.

Component C should be present in the moulding compositions according to the invention for certain purposes of use, however.

If component C is present in the moulding compositions, the ratio by weight of components B:C should be between 2:1 and 1:4, preferably between 1:1 and 1:2, in order to achieve the desired level of mechanical properties for certain purposes of use.

Component D

Component D comprises at least one phosphorus compound of formula (I).

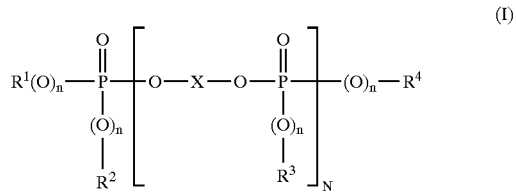

(I)

In the above formula, $R^1$, $R^2$, $R^3$ and $R^4$, independently of each other, each denote $C_1$–$C_8$-alkyl, $C_5$–$C_6$-cycloalkyl, $C_6$–$C_{12}$-aryl or $C_7$–$C_{12}$-aralkyl; $C_6$–$C_{10}$-aryl or $C_7$–$C_{12}$-aralkyl are preferred. The aromatic groups $R^1$, $R^2$, $R^3$ and $R^4$ may themselves be substituted with halogen or alkyl groups. The aryl radicals which are particularly preferred are cresyl, phenyl, xylenyl, propylphenyl or butylphenyl, as well as the corresponding brominated and chlorinated derivatives thereof.

X in formula (I) denotes a mono- or polynuclear aromatic radical containing 6 to 30 carbon atoms. These are derived from diphenols of the formula (II). Preferred diphenols are diphenylphenol, bisphenol A, resorcinol or hydroquilnone or chlorinated or brominated derivatives thereof, for example.

n in formula (I) can denote 0 or 1, which are independent of each other. n is preferably equal to 1.

N represents a number from 5 to 30. In the case of mixtures of oligomeric phosphorus compounds, N denotes the average degree of polycondensation of component D, which is always >5, preferably 5.5 to 20, particularly preferably 6 to 10.

Component E

Fluorinated polyolefins E have high molecular weights and have glass transition temperatures above −30° C., generally above 100° C. They preferably have fluorine contents of 65 to 76, particularly 70 to 76 wt. %, and have average particle diameters $d_{50}$ of 0.05 to 1,000, preferably 0.08 to 20 μm. In general, fluorinated polyolefins E have a density of 1.2 to 2.3 g/cm$^3$. The preferred fluorinated polyolefins if are polytetrafluoroethylene, polyvinylidene fluoride, tetrafluoroethylene, hexafluoropropylene and ethylene/tetrafluoroethylene copolymers. These fluorinated polyolefins are known (see "Vinyl and Related Polymers" by Schldkinecht, John Wiley & Soons, Inc. New York, 1962, pages 484–494; "Fluorpolymers" by Wall, Wiley-Interscience, John Wiley & Sons, Inc. New York, Volume 13, 1970, pages 623–654; "Modern Plastics Encyclopedia", 1970–1971, Volume 47, No. 10A, October 1970. McGraw-Hill, Inc. New York, pages 134 and 774; "Modern Plastics Encyclopedia", 1975–1976, October 1975, Volume 52, No. 10A, McGraw-Hill, Inc., New York, pages 27, 28 and 472 and U.S. Pat. Nos. 3,671,487, 3,723,373 and 3,838,092).

They can be prepared by known methods, for example by the polymerisation of tetrafluoroethylene in aqueous medium with a catalyst which forms free radicals, for example sodium, potassium or ammonium peroxydisulfate, at pressures of 7 to 71 kg/cm$^2$ and at temperatures of 0 to 200° C., preferably at temperatures of 20 to 100° C. (for further details, see U.S. Pat. No. 2,393,967 for example). Depending on the form in which they are used, the density of these materials can be between 1.2 and 2.3 g/cm$^3$, and the average particle size can be between 0.5 and 1000 μm.

The fluorinated polyolefins E which are preferred according to the invention are tetrafluoroethylene polymers with average particle diameters of 0.05 to 20 μm, preferably 0.08 to 10 μm, and a density of 1.2 to 1.9 g/cm$^3$. They are preferably used in the form of a coagulated mixture of emulsions of tetrafluoroethylene polymers E with emulsions of graft polymers B.

Tetrafluoroethylene polymers with average particle diameters of 100 to 1000 μm and densities of 2.0 g/cm$^3$ to 2.3 g/cm$^3$ are suitable fluorinated polyolefins E which can be used in the form of powders.

In order to prepare a coagulated mixture of B and E, an aqueous emulsion (latex) of a graft polymer B is first mixed with a finely divided emulsion of a tetrafluoroethylene polymer E; suitable tetrafluoroethylene polymer emulsions usually have solids contents of 30 to 70 wt. % , preferably 50 to 60 wt. %, in particular 30 to 35 wt. %.

The quantitative data given in the description of component B may include the proportion of graft polymer for the coagulated mixture of graft polymer and fluorinated polyolefins.

In the mixture of emulsions, the equilibrium ratio of graft polymer B to tetrafluoroethylene polymer E is 95:5 to 60:40. The mixture of emulsions is subsequently coagulated in the known manner, for example by spray-drying, freeze-drying or by coagulation by means of the addition of inorganic or organic salts, acids or bases, or by adding organic solvents which are miscible with water, such as alcohols or ketones, preferably at temperatures of 20 to 150° C., particularly 50 to 100° C. If necessary, the mixture can be dried at 50 to 200° C., preferably 70 to 100° C.

Suitable tetrafluoroethylene polymer emulsions are commercially available products and are sold as Teflon® 30 N by the DuPont company, for example.

Component F

Component F comprises both very finely divided inorganic powders F.1 and monophosphorus compounds F.2 of formula (1A).

The very finely divided inorganic powders F.1 which are used according to the invention preferably consist of at least one polar compound of one or more metals of the 1st to 5th main groups or of the 1st to 8th sub-groups of the periodic table, preferably of the 2nd to 5th main groups or of the 4th to 8th sub-groups, particularly preferably of the 3rd to 5th main groups or of the 4th to 8th sub-groups, or consist of compounds of these metals with the elements oxygen, hydrogen, sulfur, phosphorus, boron, carbon, nitrogen or silicon or mixtures thereof.

Examples of preferred compounds include oxides, hydroxides, hydrated oxides, sulfates, sultites, sulfides, carbonates, carbides, nitrates, nitrites nitrides, borates, silicates, phosphates., hydrides, phosphites or phosphonates.

The very finely divided inorganic powders preferably consist of oxides, polar anions, phosphates or hydroxides, preferably $TiO_2$, $SiO_2$, $SnO_2$, $ZnO$, boehmite, $ZrO_2$, $Al_2O_3$, aluminium phosphate or iron oxides, or of TiN, WC, AlO(OH), $Sb_2O_3$, iron oxides, $Na_2SO_4$, vanadium oxides, zinc borate, silicates such as Al silicates, Mg silicates or one-two- or three-dimensional silicates. Mixtures and doped compounds can also be used. Furthermore, the surfaces of these nano-scale particles can be modified with organic molecules in order to ensure better compatibility with the polymers. Hydrophobic or hydrophlic surfaces can be produced in this manner.

Hydrated aluminas, e.g. boehmite, or $TiO_2$, are particularly preferred.

The average particle diameters of the nanoparticles are less than or equal to 200 nm, preferably less than or equal to 150 nm, particularly 1 to 100 nm.

The terms particle size and particle diameter always denote the average particle diameter $d_{50}$, as determined by ultracentrifuge measurements according to W. Scholtan et al., Kolloid-Z. and Z. Polymere 250 (1972), pages 782–796.

The inorganic powder can be incorporated in the thermoplastic moulding composition in amounts of 0.5 to 40, preferably 1 to 25, particularly preferably from 3 to 15 wt. % with respect to the thermoplastic material.

The inorganic compounds may be present as powders, pastes, sols, dispersions or suspensions. Powders can be obtained by precipitation from dispersions, sols or suspensions.

The powders can be incorporated in the thermoplastic moulding compositions by conventional methods, for example, by the direct kneading or extrusion of the moulding compositions and the very finely divided inorganic powders. The preferred methods comprise the preparation of a master batch, e.g. of flame-retardant additives and at least one component of the moulding compositions according to the invention in monomers or solvents, or the co-precipitation of a thermoplastic component and the very finely divided inorganic powders, e.g. by coprecipitation from an aqueous emulsion and of the very finely divided inorganic powders, optionally in the form of dispersions, suspensions, pastes or sols of very finely divided inorganic materials.

The polymer mixtures according to the invention may contain, as further flame-retardants, one or more monophosphorus compounds of formula (IA) (component F.2)

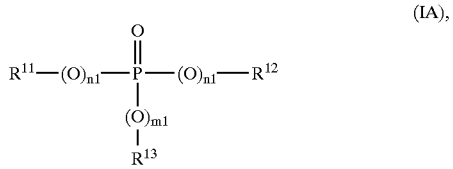

wherein $R^{11}$, $R^{12}$ and $R_{13}$, independently of each other, denote $C_1$–$C_8$-alkyl, which is optionally halogenated, or $C_6$–$C_{20}$-aryl, which is optionally halogenated, ml denotes 0 or 1, and nl denotes 0 or 1.

The phosphorus compounds which correspond to component F.2 and which are suitable according to the invention are generally known (see, for example, Ullmann's Enzyklopädie der technischien Chemie, Vol. 18. page 301 et seq. 1979; Houben-Weyl, Methoden der Organischen Chemie, Vol. 12/1, page 43; Beilstein, Vol. 6, page 177).

The preferred substituents $R^{11}$ to $R^{13}$ comprise methyl, ethyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl. The substituents which are particularly preferred are methyl, ethyl, butyl and phenyl which is optionally substituted by methyl, ethyl, chlorine and/or bromine.

Examples of preferred phosphorus compounds F.2 include tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate. tri-(isopropylphenyl) phosphate, halogen-substituted aryl phosphates, methylphosphonic acid dimethyl esters, methylphosphonic acid diphenyl esters, phenylphosphonic acid diethyl esters, triphenylphosphine oxide and tricresylphosphine oxide.

The sought-after flame-retardancy of the moulding compositions according to the invention can therefore be achieved by the use of oligomeric phosphorus compounds of formula (I) in combination with very finely divided inorganic powders F.1, which have a synergistic effect, or oligomeric phosphorus compounds of formula (I) in combination with monophosphorus compounds F.2 of formula (IA), or, if particularly severe demands are made on the flame-retardancy, by the use of oligomeric phosphorus compounds of formula (I) in combination with very finely divided inorganic powders F.1, which have a synergistic effect, and with monophosphorus compounds F.2 of formula (IA).

Moreover, the moulding compositions according to the invention may contain at least one of the usual additives, such as internal lubricants and demoulding agents, nucleating agents, anti-static agents and stabilisers, as well as colorants, pigments and/or reinforcing materials. Suitable inorganic reinforcing materials include glass fibres, which are optionally chopped or milled, glass beads, glass spheres, or lamellar reinforcing material such as kaolil, talc, mica or carbon fibres. Chopped or millled glass fibres are preferably used as the reinforcing material. These preferably have a length of 1 to 10 mm and a diameter of <120 μm and are used in an amount of 1 to 40 parts by weight; the glass fibres are preferably surface-treated.

The moulding compositions according to the invention, which contain components A to F and optionally other known additives such as stabilisers, colorants, pigments, internal lubricants and demoulding agents, as well as antistatic and reinforcing materials, are produced by mixing the respective constituents in the known manner and compounding and extruding them in the melt at temperatures of 200° C. to 300° C. in conventional processing units such as internal kneaders, extruders and twin-shaft endless screw devices, wherein component E is preferably used in the form of the aforementioned coagulated mixture.

Mixing of the individual constituents can be effected in the known manner, either successively or simultaneously, and either at about 20° C. (room temperature) or at elevated temperature.

The moulding compositions of the present invention can be used for the production of moulded articles of any type. In particular, moulded articles can be produced by injection-moulding. Examples of moulded articles which can be produced include: housing parts of any type, e.g. for domestic appliances such as juice presses, coffee machines or mixers, for office equipment such as copiers, printers or monitors, or covering panels in the building sector and parts for the motor vehicle sector. Moreover, the moulded articles can be used in the field of electrical engineering, because they exhibit very good electrical properties.

Another form of processing is the production of moulded articles by the thermoforming of prefabricated panels or sheets.

The moulding compositions are particularly suitable for the production of moulded articles where particularly severe demands are made on the flame-retardancy of the plastics used.

Therefore, the present invention also relates to the use of the moulding compositions according to the invention for the production of moulded articles of any type, preferably of the aforementioned type, and also relates to moulded articles produced from the moulding compositions according to the invention.

EXAMPLES

Component A

A linear polycarbonate based on bisphenol A with a relative solution viscosity of 1.252, as measured in $CH_2Cl_2$ as the solvent at 25° C. and at a concentration of 0.5 g/100 ml.

Component B

A graft polymer containing 40 parts by weight of a copolymer of styrene and acrylonitrile in a ratio of 73:27 on 60 parts by weight of particulate, crosslinked polybutadiene rubber (average particle diameter $d_{50}$=0.3 μm), produced by emulsion polymerisation.

Component C

A styrene/acrylonitrile copolymer with a styrene/acrylonitrile ratio of 72:28 and a limiting viscosity of 0.55 dl/g (as measured in dimethylformamide at 20° C).

Component D

An oligophosphate of m-phenylene-bis(di-phenyl-phosphate) with N=7.

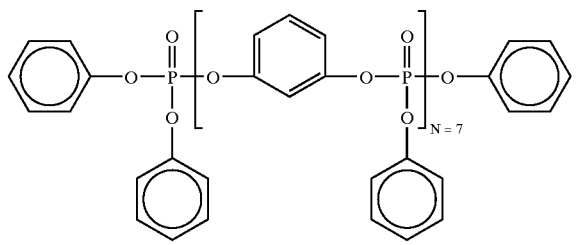

Component E

A tetrafluoroethylene polymer as a coagulated mixture of an SAN graft polymer emulsion corresponding to B in water and a tetrafluoroethylene polymer emulsion in water. The ratio by weight of graft polymer B to tetrafluoroethylene polymer E in the mixture is 90 wt. % to 10 wt. %. The tetrafluoroethylene polymer emulsion has a solids content of 60 wt. %, and its average particle diameter is between 0.05 and 0.5 μm. The SAN graft polymer emulsion has a solids content of 34 wt. % and an average latex particle diameter of 0.4 μm.

Production of E

The emulsion of tetrafluoroethylene polymer (Teflon 30 N; a product of DuPont) was mixed with the emulsion of SAN graft polymer B and stabilised with 1.8 wt. % with respect to the polymeric solids, of phenolic antioxidants. The mixture was coagulated at 85 to 95° C. with an aqueous solution of $MgSO_4$ (Epsom salts) and acetic acid at pH 4 to 5, filtered and washed until practically free from electrolyte, was then freed from the bulk of the water by centrifuging and thereafter was dried at 100° C. to form a powder. This powder could then be compounded with the other components in the processing unit described above.

Component F

F.1: Pural 200, an aluminium oxide hydroxide (a product of Condea, Hamburg, Germany); average particle size about 50 nm.

F.2: triphenyl phosphate, Disflamoll TP; (a product of Bayer AG, Leverkusen, Germany).

Production and Testing of Mould in Compositions According to the Invention

Mixing of components A to F was effected in a 3 liter internal kneader. The moulded articles were produced in an injection-moulding machine, type Arburg 270 E, at 260° C.

The notched bar impact strength was determined by ISO method 180 1A on bars of dimensions 80×10×4 mm³ at room temperature.

The flame-resistance was determined according to UL 94V.

The compositions of the materials tested and the data obtained are summarised in the following Table.

TABLE 1

Compositions and properties of polycarbonate-ABS moulding compositions

| Example | 1 comparison | 2 | 3 | 4 |
|---|---|---|---|---|
| Component (parts by weight) | | | | |
| A | 66.7 | 66.7 | 66.7 | 66.7 |
| B | 7.3 | 7.3 | 7.3 | 7.3 |
| C | 9.4 | 9.4 | 9.4 | 9.4 |
| D | 12.0 | 12.0 | 9.0 | 9.0 |
| E | 4.2 | 4.2 | 4.2 | 4.2 |
| F.1 | — | 0.75 | — | 0.75 |
| F.2 | — | — | 3.0 | 3.0 |
| Properties: | | | | |
| ak(ISO 1801A[kJ/m]) | 15 | 18 | 55 | 62 |
| UL 94 V 3.2 mm | | | | |
| Assessment | n.d. | V1 | V0 | V0 |
| Total ABT* (s) | 136 | 39 | 22 | 26 |
| UL 94 V 1.6 mm | | | | |
| Assessment | n.d. | V1 | V0 | V0 |
| Total ABT* (s) | 266 | 53 | 27 | 22 |

*ABT = afterburning time

The Table shows the surprising improvement in flame-resistance and mechanical properties due to the use of the flame-retardant combinations according to the invention.

What is claimed is:

1. A flame-retardant thermoplastic moulding composition containing
   A 5 to 95 parts by weight of an aromatic polycarbonate or polyestercarbonate
   B. 0.5 to 60 parts by weight of at least one graft polymer of
   B.1 5 to 95 wt. % of one or more vinyl monomers on
   B.2 95 to 5 wt. % of one or more graft substrates with a glass transition temperature <10° C.
   C. 0 to 45 parts by weight of a thermoplastic vinyl copolymer,
   D. 0.5 to 20 parts by weight of at least one phosphorus compound of general formula (I)

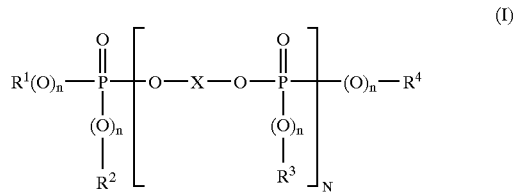

wherein
   $R^1$, $R^2$, $R^3$, and $R^4$, independently of each other, each represent $C_1$- to $C_8$-alkyl, $C_5$- to $C_6$-cycloalkyl, $C_6$- to $C_{20}$-aryl or $C_7$- to $C_{12}$-aralkyl, which are optionally halogenated,
   n represents 0 or 1, which are independent of each other,
   N is an average number from 5 to 30,
   X represents a mono- or polynuclear aromatic radical containing 6 to 30 carbon atoms,
   E 0 to 5 parts by weight of a fluorinated polyolefin, and
   F.1 0.5 to 40 parts by weight of a finely divided inorganic powder with an average particle diameter of less than or equal to 200 nm, and/or
   F.2 05 to 20 parts by weight of a monophosphorus compound of formula (IA)

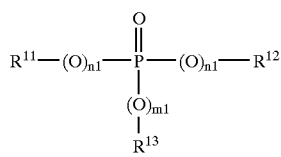

wherein
$R^{11}$, $R^{12}$ and $R^{13}$, independently of each other, denote $C_1$–$C_8$-alkyl, which is optionally halogenated, or $C_6$–$C_{20}$-aryl, which is optionally halogenated,
m1 denotes 0 or 1, and
n1 denotes 0 or 1,
wherein the sum of all the parts by weight of all the components is 100.

2. A moulding composition according to claim 1, wherein the phosphorus compounds of formula (I) have an average N of 5.5 to 20.

3. A moulding composition according to claim 1, wherein in formula (I) $R^1$ to $R^4$ each denote, independently of each other, a cresyl, phenyl, xylenyl, propylphenyl or butylphenyl radical which is optionally brominated or chlorinated, and X is derived from bisphenol A, resorcinol or hydroquinone, which are optionally chlorinated or brominated.

4. A moulding composition according to claim 1, wherein X in formula (I) is derived from diphenols of the formula (II)

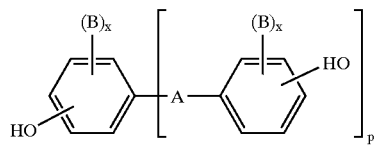

wherein
A denotes a single bond, a $C_1$–$C_5$ alkylene, $C_2$–$C_5$ alkylidene, $C_5$–$C_6$ cycloalkylidene, —O—, —SO—, —CO—, —S—, —SO$_2$— a $C_6$–$C_{12}$-arylene radical, which can be condensed with other rings which optionally contain heteroatoms, a radical of formula (III)

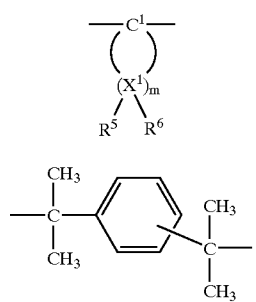

or a radical of formula (IV)
radicals B, independent of each other, each denote a $C_1$–$C_8$ alkyl radical, a halogen, a $C_6$–$C_{10}$-aryl radical, or a $C_7$–$C_{12}$-aralkyl radical,
x denotes 0.1 or 2, which are independent of each other in each case,
p is 1 or 0, and
$R^5$ and $R^6$ independently for each $X^1$ and of one another is selected from the group consisting of hydrogen and $C_1$–$C_6$-alkyl,
$X^1$ denotes carbon, and
m denotes an integer from 4 to 7, with the proviso that $R^5$ and $R^6$ simultaneously denote alkyl on at least one $X^1$ atom.

5. A moulding composition according to claim 1, wherein the monophosphorus compound F.2 of formula (IA) is at least one member selected from the group consisting of tributyl phosphate, tris-(2-chloroethyl) phosphate, tris-(2,3-dibromopropyl) phosphate, triphenyl phosphate, tricresyl phosphate, diphenylcresyl phosphate, diphenyl-octyl phosphate, diphenyl-2-ethylcresyl phosphate, tri-(isopropylphenyl) phosphate, a halogen-substituted aryl phosphate, methylphosphonic acid dimethyl ester, methylphosphonic acid diphenyl ester, phenylphosphonic acid diethyl ester, triphenylphosphine oxide and tricresylphosphine oxide.

6. A moulding composition according to claim 1, containing, as component F.1, compounds of one of the metals of the 1st to 5th main groups or of the 1st to 8th sub-groups of the periodic table with the elements oxygen, sulfur, boron, carbon, phosphorus, nitrogen, hydrogen, or silicon or mixtures thereof.

7. A moulding composition according to claim 6, containing, as component F.1, compounds of at least one of the metals of the 2nd to 5th main groups or of the 4th to 8th sub-group of the periodic table with the elements oxygen, sulfur, boron, carbon, phosphorus, nitrogen, hydrogen or silicon or mixtures thereof.

8. A moulding composition according to claim 7, wherein component F.1 is an oxide, hydroxide or phosphate.

9. A moulding composition according to claim 8, wherein component F.1 is selected from at least one of the compounds $TiO_2$, $SiO_2$, $SnO_2$, $ZnO$, boehmite, $ZrO_2$, $Al_2O_3$, aluminium phosphate, iron oxides and mixtures and doped compounds thereof.

10. A moulding composition according to claim 9, wherein component F.1 is boehmite or $TiO_2$.

11. A moulding composition according to claim 1, wherein inorganic powder F.1 has an average particle diameter less than or equal to 200 nm.

12. A moulding composition according to claim 1, containing 30 to 90 parts by weight of component A, 1 to 40 parts by weight of component B, 0 to 30 parts by weight of component C, 1 to 18 parts by weight of component D and 1 to 25 parts by weight of component F.1 and/or 1 to 18 parts by weight of F.2.

13. A moulding composition according to claim 1, containing 50 to 80 parts,by weight of component A, 2 to 25 parts by weight of component B, 2 to 25 parts by weight of component C, 2 to 15 parts by weight of component D and 2 to 15 parts by weight of component F.1 and/or 2 to 15 parts by weight of component F.2.

14. A moulding composition according to claim 1, wherein the ratio by weight of components B:C is between 2:1 and 1:4.

15. A moulding composition according to claim 1, characterised in that graft substrate B.2 is a member selected from the group consisting of diene rubber, an acrylate rubber, a silicone rubber and an ethylene-propylene-diene rubber.

16. A moulding composition according to claim 1, characterised in that
the composition contains at least one additive selected from the group
consisting of stabilisers, pigments, demoulding agents, flow enhancers, inorganic reinforcing materials and antistatic agents.

17. A molded article comprising the composition of claim 1.

* * * * *